US006988386B1

(12) United States Patent
Okawa et al.

(10) Patent No.: US 6,988,386 B1
(45) Date of Patent: Jan. 24, 2006

(54) KNITTED SURFACE FASTENER

(75) Inventors: Mitsuhisa Okawa, Toyama-ken (JP); Eiji Nakayama, Toyama-ken (JP); Mitsutoshi Ishihara, Toyama-ken (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 11/188,608

(22) Filed: Jul. 25, 2005

(30) Foreign Application Priority Data

Aug. 6, 2004 (JP) ............................ 2004-231371

(51) Int. Cl.
*D04B 21/02* (2006.01)

(52) U.S. Cl. ........................................................ 66/195

(58) Field of Classification Search .......... 66/191–195; 24/444, 445
See application file for complete search history.

(56) References Cited

U.S. PATENT DOCUMENTS 4,338,800 A * 7/1982 Matsuda ...................... 66/194
4,838,044 A * 6/1989 Matsuda et al. .............. 66/190
5,125,246 A * 6/1992 Shytles ........................ 66/195
5,214,942 A * 6/1993 Peake et al. .................. 66/194
5,373,712 A * 12/1994 Yamamoto et al. ........... 66/195
5,407,722 A * 4/1995 Peake et al. .................. 66/194
6,096,667 A * 8/2000 Rhode ......................... 66/194
6,843,077 B1 * 1/2005 Ishihara et al. ............... 66/194

* cited by examiner

*Primary Examiner*—Danny Worrell
(74) *Attorney, Agent, or Firm*—Michael S. Leonard; Everest Intellectual Property Law Group

(57) ABSTRACT

The invention provides a knitted surface fastener made of warp knitted fabric, which eliminates necessity of resin coating for fixing a base portion of a pile loop and fusion between yarns, securing flexibility and ventilation proper to knitted fabric wherein, in a base fabric of a surface fastener, wales are formed with at least chain knitting yarns and the respective wales are connected including at least weft in-laid yarns, engaging element loops are formed of first and second engaging element forming yarns striding over two or more wales and the respective engaging element forming yarns are knitted into at least three adjoining courses on a same wale in a zigzag shape, at this time, the first and second engaging element forming yarns are knitted into adjoining same stitches of at least two or more courses of the same wale in the zigzag shape.

5 Claims, 9 Drawing Sheets

KNITTED SURFACE FASTENER

BACKGROUND OF THE INVENTION

1. Field of the Invention

The present invention relates to a surface fastener obtained by warp knitting and more particularly to a knitted surface fastener that secures flexibility characteristic to knitted fabric without necessity of back coating.

2. Description of the Related Art

In a surface fastener made of fiber, engaging element forming yarns are woven or knitted in so as to form a plurality of loops on a surface of a base fabric at a same time when the base fabric is woven or knitted. Each of the loops serves as a female engaging element as it is or it forms a hook-like or mushroom-shaped male engaging element by cutting a part thereof. In order to prevent the engaging element from loosing out of the base fabric in the surface fastener obtained by weaving or knitting, a surface opposite to the surface having the engaging elements is coated with resin or so-called back coating is performed so as to bond the base fabric with the engaging elements as disclosed in for example, Japanese Utility Model Publication No. 2563369.

This back coating can prevent the engaging elements from loosing out of the base fabric. However, it is usually necessary to apply resin over an entire surface of the base fabric in order to prevent the engaging elements from loosing out. As a result, the entire base fabric hardens so that gaps between stitches or weave patterns are covered with resin except the aforementioned Japanese Utility Model Publication No. 2563369 disclosing a net-like base fabric, and as a consequence, ventilation becomes poor. Thus, a surface fastener which prevents the engaging elements from loosing out without necessity of back coating and at the same time, secures flexibility particular to knitted or woven fabric has been demanded strongly.

For example according to Japanese Patent Application Laid-Open No. 63-200705, knitting yarn strides over wales of first to third chain knitting yarns so as to form a loop on a same course. More specifically, after yarn for forming an engaging element is knitted in a zigzag shape into three courses adjoining each other on a second wale, it moves to an adjoining first wale while forming a loop. Then, it is knitted into the three courses in the zigzag shape and returns to the original second wale while making a loop and there, the three courses are knitted in the zigzag shape and the knitting stage moves to the adjoining first wale and this pattern is repeated.

While the yarn for forming the engaging elements is knitted into the three courses on the first and second wales in the zigzag shape, a second yarn for forming engaging elements is operated in a same way between the second and third wales so as to form a loop. Further, according to the Japanese Utility Model Publication No. 2563369, a heat shrinkage ratio of a warp yarn of the base fabric and loop yarn is set higher than that of a weft yarn in order to prevent the engaging elements from loosing out, and thereby the loop yarn is fixed by heat shrinkage. By adopting such a structure, the loop is fixed to the base fabric without back coating. However, plural loop yarns are not knitted into the same course on the same wale formed with the chain knitting yarns but a single loop yarn is knitted into each course and therefore, the engaging elements are likely to loose out.

Likewise, Japanese Patent Application No. 2003-274704 has proposed a warp knitted surface fastener made of fibers equipped with a knitting construction in which a loop is fixed to a base fabric securely without necessity of back coating or use of any particular heat shrinkage yarn.

According to the invention of the Japanese Patent Application No. 2003-274704, a loop is formed across two or more wales with a pile knitting yarn for forming a pile loop and after that, the pile knitting yarn is entangled with each stitch of adjoining three or more courses on the wales continuously so as to form a stitch. Among the stitches of the pile knitting yarn formed when the pile knitting yarn is entangled with each of the adjoining three or more courses, at least one or more stitches located in a middle are formed with a closed loop. Thus, if the stitch at a loop end formed across an adjoining wale is of an open loop, even if that loop is pulled strongly, the stitches formed with the aforementioned closed loop in the middle is tightened from both directions, the stitch is fixed tightly so that it is not pulled out. As a result, the base portion of the pile loop is firmly fixed not only to a base fabric having a high density knitting structure but also to a net-like base fabric, and even if no resin coating is performed or adjoining yarns are not fused together, prevention of the loosing out of the engaging element is carried out securely.

Although, according to the Japanese Patent Application No. 2003-274704, the loop yarn is securely prevented from loosing out because the loop forming yarn is entangled with three or more courses adjoining a chain knitting yarn constituting the wale and a stitch located in the middle of those stitches is entangled with a stitch of chain knitting yarn with a closed loop, the stitch formed with the closed loop not only increases a thickness of the base fabric due to its stitch structure but also increases its hardness, thereby likely damaging flexibility required for knitted fabric.

SUMMARY OF THE INVENTION

Accordingly, an object of the present invention is to provide a knitted surface fastener which eliminates necessity of back coating and fusion between yarns, prevents a loop yarn from loosing out and maintains flexibility proper to knitted fabric.

In order to achieve the above-described object, there is provided a surface fastener made of warp knitted fabric in which a base fabric is warp knitted and, at a same time, plural engaging element loops of at least any one of male and female are formed on a surface, wherein the surface fastener comprises warp knitting yarns for forming wales and connecting yarns for connecting the respective wales, wherein each of the engaging element loop is formed of engaging element forming yarns striding over two or more wales, the engaging element forming yarns includes adjoining first and second engaging element forming yarns and each of the engaging element forming yarns is knitted over at least three courses adjoining on a same wale in a zigzag shape, and adjoining first and second engaging element forming yarns are knitted into at least two courses of a same wale at a same time.

Although a preferred embodiment of each of the warp knitting yarns is a chain knitting yarn and a preferred embodiment of each of the connecting yarns is a weft in-laid yarn, it is permissible to use a tricot knitting yarn as other embodiment of the warp knitting yarn. In this case, although it is permissible not to use any connecting yarn, use of the weft in-laid yarn is preferable because it stabilizes a configuration of a knitted product.

The first and second engaging element forming yarns may be knitted in a doubled manner in a same wale and the first and second engaging element forming yarns may be knitted in a same wale such that they intersect each other. Further, the engaging element loops are preferred to be disposed in a staggered fashion. Each of the engaging element forming yarns is constituted of multi-filament or mono-filament independently or it is permissible to knit both of them at a same time so that they are mixed.

In the knitted surface fastener of the present invention, the first and second engaging element forming yarns are formed so as to stride between a second wale and a third wale adjoining each other interposing a row of a first wale between them and inserted through stitches of foundation yarns of three or more courses adjoining on a same wale in a zigzag shape, and the engaging element forming yarn is knitted together with the adjacent engaging element forming yarn for forming an engaging element over several courses at a same time. As a consequence, the engaging element can be prevented from loosing out like the knitted surface fastener of the Japanese Patent Application Laid-Open No. 63-200705. The knitted surface fastener of the Japanese Utility Model Publication No. 2563369 is not worth being compared with the present invention. Further, if compared with the Japanese Patent Application No. 2003-274704, because the engaging element forming yarns are knitted through the stitches of the foundation yarns in the zigzag shape, a thickness of the base fabric does not increase and thus, as for its tactile feeling, flexibility proper to the knitted fabric is maintained.

If the first and second engaging element forming yarns are knitted in a doubled manner into the same course on the same wale, since the respective engaging element forming yarns make contact with each other, they deviate less due to application of friction force and thus, they are unlikely to loose out. If the first and second engaging element forming yarns are knitted such that they intersect each other, since they restrict a movement of each other at an intersection point, they are also unlikely to loose out from the base fabric.

By disposing the engaging elements on the surface of the base fabric in a staggered fashion, residual stress at loop formation positions is distributed equally both in warp and weft directions so as to maintain a plane shape of an entire product. If the engaging elements are disposed uniformly in the warp direction or weft direction or in a bias direction on the surface of the base fabric, directivity is generated in residual stress at the formation positions of the engaging elements, whereby a product is entirely wound in a single direction.

As each of the engaging element forming yarns, the multi-filament or mono-filament is used. If the multi-filament is used independently, a female surface fastener is produced and if the mono-filament is used independently, male or female surface fastener is produced. In any way, if a loop shape is maintained, it can be used as a female surface fastener. In case of the multi-filament, usually, after loops are formed, loops of each filament are separated by napping or other similar way and the loops are directed in multiple ways. On the other hand, usually, a male engaging element is formed in a hook shape or mushroom shape. For that purpose, hooks are formed by cutting out side portions of the loops knitted into the base fabric, or mushroom-shaped male engaging elements are formed by cutting out top ends of the loops and fusing the ends as described in the Japanese Patent Application Laid-Open No. 63-200705. To mix male and female engaging elements, usually, loops made of the multi-filament and mono-filament are knitted and mixed such that they are distributed over the base fabric.

DESCRIPTION OF THE PREFERRED EMBODIMENTS

A surface fastener of the present invention is a warp knitted surface fastener made of fiber, which has a plurality of engaging elements on a single surface. For the engaging elements, while a base fabric is knitted, loops are formed across a mandrel disposed in a knitting section of a knitting machine such that they stride over two or more wales. In case of a female surface fastener, the loops composed of multi-filaments are napped so as to separate each filament and directed in multiple directions. In case of a male surface fastener, an end side of each loop formed with mono-filament is cut out so as to form a hook. After these treatments are performed, an entire shape of the surface fastener is fixed by implementing thermal setting. In case of a male engaging element, depending on a case, a top of a loop may be cut out and that cut portion is melted by heat so as to form a mushroom-shaped expanded structure. In a following example, a male knitted surface fastener having hook-shaped male engaging elements will be described. Although the following example uses a chain knitting yarn as a warp knitting yarn, the present invention is not restricted to this but it is permissible to use a tricot knitting yarn.

Hereinafter, a typical embodiment of the present invention will be described further in detail with reference to accompanying drawings.

First Embodiment

Figure 1:
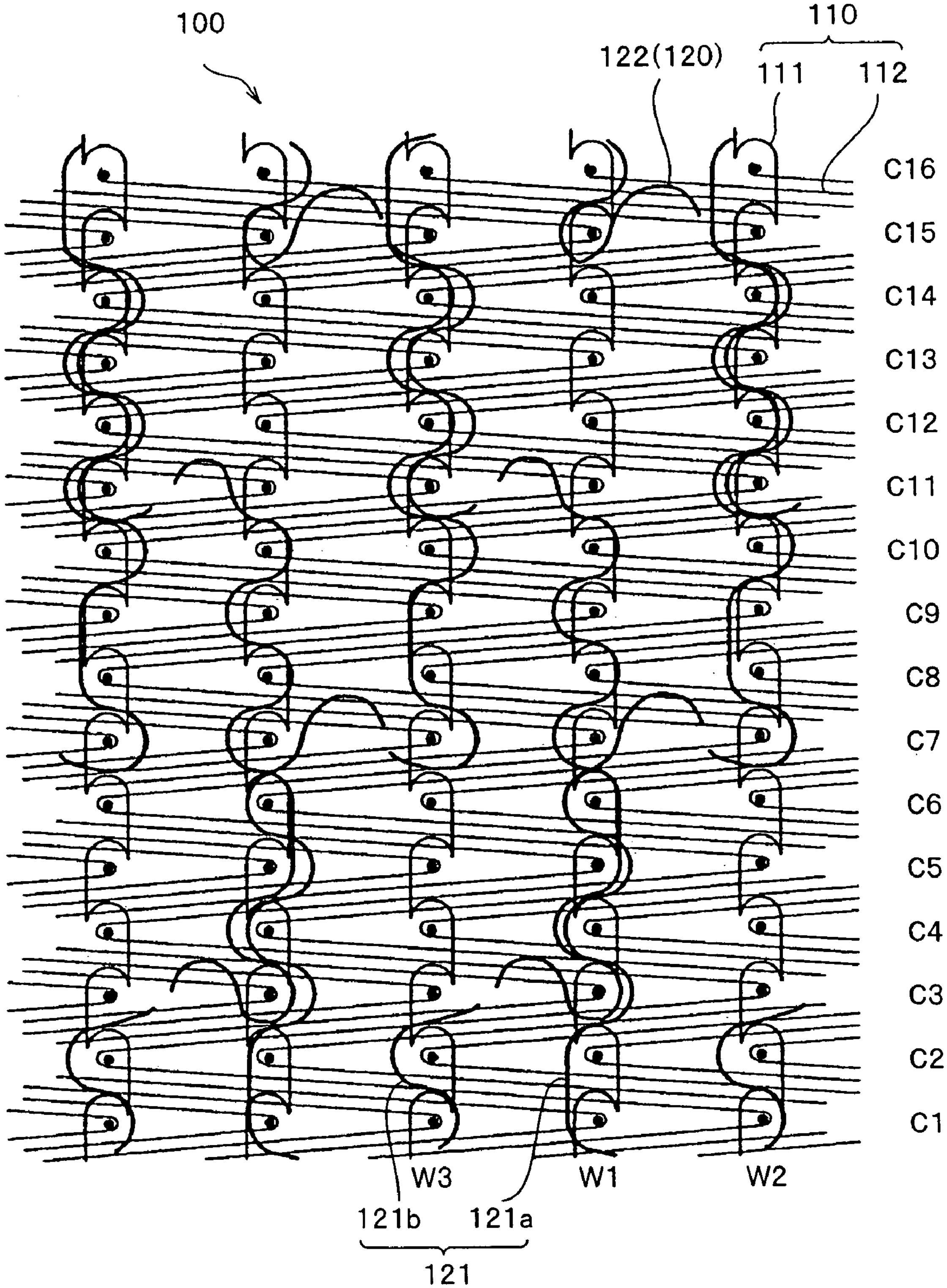
FIG. 1 is an entire structure diagram of a knitted surface fastener according to a first embodiment of the present invention.
Figure 2:
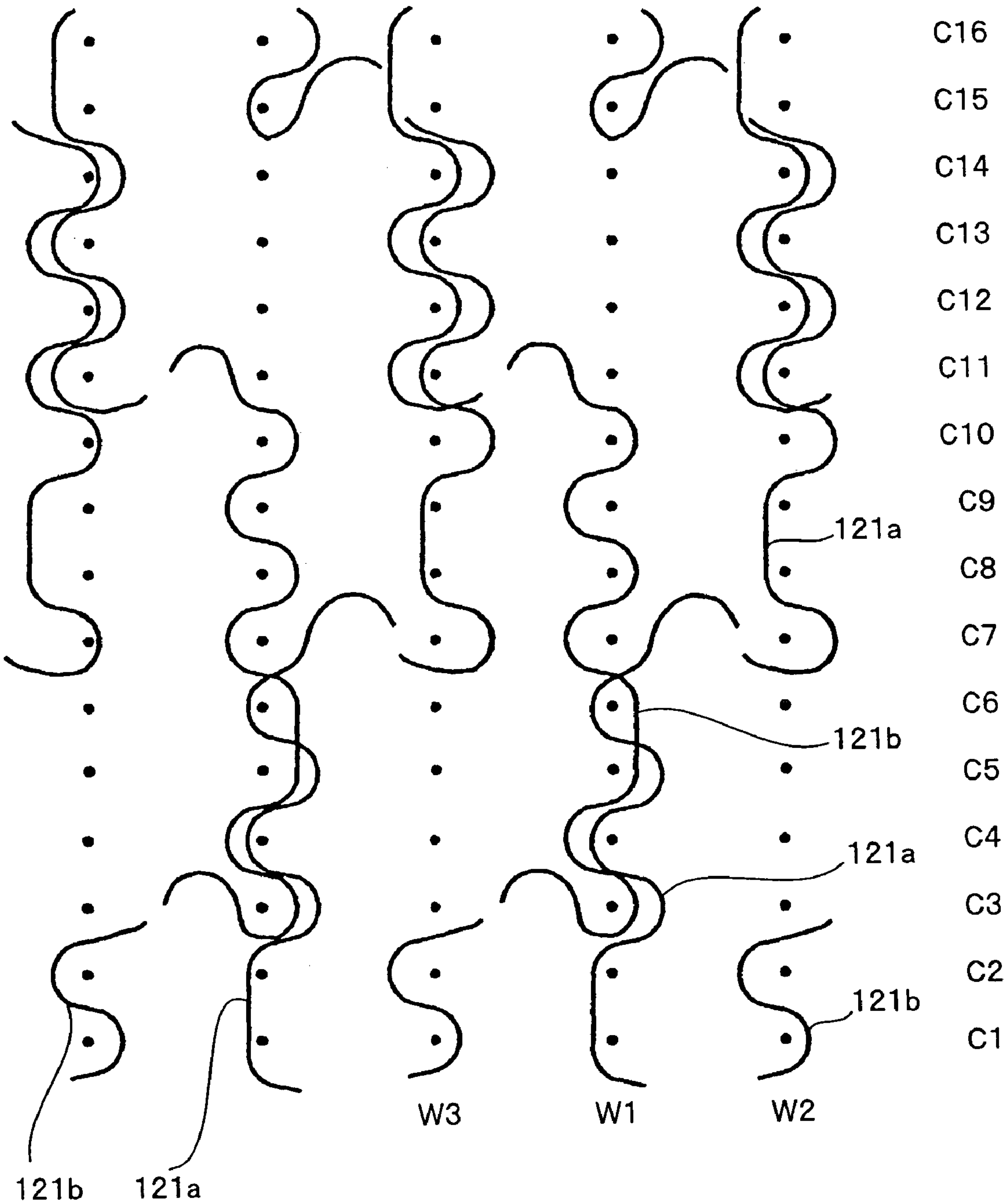
FIG. 2 is a knitting structure diagram of first and second engaging element forming yarns excluding a base fabric structure of the same surface fastener.
Figure 3:
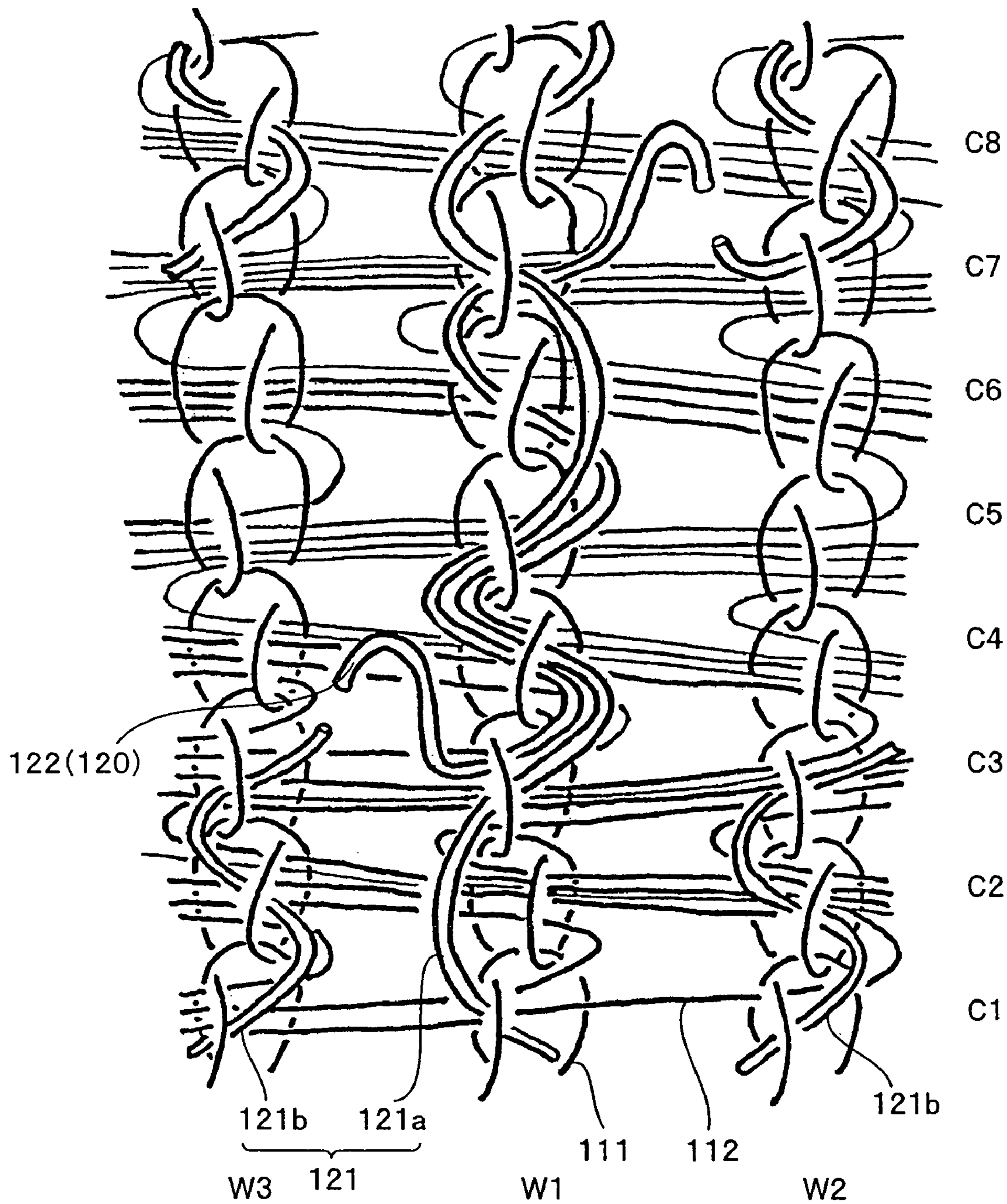
FIG. 3 is a 3-dimensional diagram schematically showing part of the knitting construction of the same surface fastener.

FIG. 1 shows an entire structure diagram of the male knitted surface fastener according to a first embodiment of the present invention. FIG. 2 shows an independent structure of engaging element forming yarns in the first embodiment. FIG. 3 schematically shows a knitting construction of an entire surface fastener. Although in FIG. 3, sizes of composition yarns are changed or stitches and its densities are expressed extremely large in order to facilitate understanding, actually, the sizes of the composition yarns are arbitrary. Further, since the densities of the stitches are high, gaps formed between stitches are extremely small.

A male surface fastener 100 of this embodiment is composed of a base fabric 110 and hooks 120 protruded from an entire surface of the base fabric 110. The base fabric 110 is constituted of chain knitting yarns 111 having 1-0/0-1 structure which forms a wale W, and weft in-laid yarns 112 having 0-0/5-5 structure which run in a zigzag shape across five wales W and are inserted into stitches of the chain knitting yarns 111. For each of the chain knitting yarns 111 and the weft in-laid yarns 112, usually, multi-filament is used. However, this embodiment is not restricted to it but it is permissible to use a textured yarn, a twisted yarn or a spun yarn. According to this embodiment, at a same time when the base fabric 110 is knitted, engaging element forming yarns 121 composed of mono-filament are knitted into the same base fabric so as to form engaging element loops 122. Side portions of the loops 122 are cut out during knitting or after knitting so as to form the hooks 120.

According to this embodiment, the engaging element forming yarns 121 are constituted of first and second engaging element forming yarns 121*a*, 121*b*. As for knitting structures of the first and second engaging element forming yarns 121*a*, 121*b*, as shown in FIG. 2, the first engaging element forming yarn 121*a* is 2-2/2-2/1-1/2-2/1-1/2-2/0-0/1-1/1-1/0-0/1-1/0-0/1-1/0-0/2-2/1-1 and the second engaging element forming yarn 121*b* is 1-1/2-2/0-0/1-1/0-0/0-0/1-1/0-0/1-1/0-0/2-2/1-1/2-2/1-1/2-2/2-2.

Referring to FIG. 3, when viewing a certain wale (first wale W1) in a center, after the first and second engaging element forming yarns 121*a*, 121*b* are knitted into the first wale W1 in a zigzag shape, they are brought to second and third wales W2, W3 adjoining the first wale W1 on right and left thereof and knitted into the respective wales W2, W3 in the zigzag shape. Next, they return to the original first wale W1 while forming engaging element loops 122 and knitted into the first wale W1 in the zigzag shape and this pattern is repeated. At this time, part of the first and second engaging element forming yarns 121*a*, 121*b* knitted into the first wale W1 in the zigzag shape are knitted into plural common courses C3 to C6 in the zigzag shape and their remainders are separately knitted into different courses C1, C2; C7 to C10 on the first wale W1.

More specifically, the first engaging element forming yarn 121*a* is (1) inserted into a sinker loop of a chain stitch formed on a course C1 on the same wale W1 and after that, jumps a first chain stitch of a next course C2 and inserted into a sinker loop of a chain stitch of a next course C3 with its direction changed. (2) Subsequently, it is inserted through sinker loops of respective chain stitches of adjoining four courses C4 to C7 in the zigzag shape and then inserted into the sinker loop of the chain stitch formed in the same course C7 on the wale W2 adjoining on the right side in FIG. 1. While it moves to this adjoining wale W2, it strides over a mandrel (not shown) so as to form an engaging element loop 122. After moving to the adjoining wale W2, the first engaging element forming yarn 121*a* is (3) changed in direction and inserted into a first sinker loop of a chain stitch formed in a next course C8 adjacent to the course C7 on the same wale W2. (4) Subsequently, it strides over a first chain stitch formed in a course C9 and inserted into a sinker loop of a chain stitch of a next course C10. (5) Subsequently, it is inserted into each sinker loop of respective chain stitches formed in five courses C11 to C15 in the zigzag shape and (6) returned to the course 15 on the original wale W1 while forming an engaging element loop 122, and inserted into a sinker loop of chain stitch formed in the same course C15, and then, (7) turned over and inserted into a sinker loop of a chain stitch formed in a next course C16 adjacent like the above-described (1). After that, this pattern is repeated.

On the other hand, the second engaging element forming yarn 121*b* is (1)' located on the same course C1 received the above-described operation of the (1) by the first engaging element forming yarn 121*a* and it is inserted into a sinker loop of a chain stitch on the wale W3 adjoining on the left side in FIG. 1 in an opposite direction to the insertion direction of the first engaging element forming yarn 121*a*. (2)' Its direction is turned over and it is inserted into each sinker loop of chain stitches of the next courses C2, C3 in the zigzag shape and (3)' moves to the wale W1 adjoining on the right side in FIG. 1 while forming the engaging element loop 122 and it is inserted into a sinker loop of a chain stitch of the course C3 on the same wale W1. After that, (4)' it is inserted through continuous courses C4 and C5 on the same wale W1 in the zigzag shape and then, (5)' it strides over a first chain stitch of the next course C6 and is inserted into a sinker loop formed on the course C7. (6)' The second engaging element forming yarn is inserted through respective sinker loops of chain stitches formed on the courses C8 to C11 in the zigzag shape and (7)' returned to the course C11 on the original wale W3 while forming the engaging element loop 122 and after it is inserted into a sinker loop of a chain stitch of the same course C11, it is inserted through respective sinker loops of chain stitches of the four adjoining courses C12 to C15 in the zigzag shape. Then, (8)' it strides over a first chain stitch. The procedure returns to the operation of (1)' and the above-described pattern is repeated.

Here, the first engaging element forming yarn 121*a* strides over a chain stitch in the courses C1, C2 on the wale W1 and in the courses C8, C9 on the wale W2 and is inserted into each stitch in the next courses C3, C10 in the zigzag shape. The second engaging element forming yarn 121*b* strides over a chain stitch in the courses C5, C6 on the wale W1 and in the courses C15, C16 on the wale W3 and is inserted into each stitch in the next courses C7, C1 in the zigzag shape. The reason is that when the knitting construction of each of the engaging element forming yarns 121*a*, 121*b* is composed of repetition of even course number (16 courses) and the first and second engaging element forming yarns 121*a*, 121*b* are knitted in parallel in the zigzag shape, it needs to stride over two chain stitches in every repetition unit as described above, in order to dispose the engaging element loops 122 formed with each of the engaging element forming yarns 121*a*, 121*b* in a staggered fashion and knit the first and second engaging element forming yarns 121*a*, 121*b* in parallel in the zigzag shape. The warp knitted fabric in which the engaging element loops 122 are knitted is subjected to thermal setting at a same time or after the knitting and at a same time, side portions of the engaging element loops 122 are cut out so as to form the hooks 120.

In the warp knitted surface fastener 100 of this embodiment obtained in this way, the first engaging element forming yarn 121*a* and the second engaging element forming yarn 121*b* are knitted into each wale and the hooks 120 formed of the first engaging element forming yarn 121*a* and the second engaging element forming yarn 121*b* are alternately disposed in a warp knitting direction between wales disposed so as to sandwich a wale between them. According to this embodiment, as shown in FIGS. 1 and 3, because the first and second engaging element forming yarns 121*a*, 121*b* are knitted into stitches in the zigzag shape on adjoining three or more courses of the chain knitting yarn 111 on the same wale with part of the courses shared under 1-1/0-0 warp in-laid structure, in addition to that the first and second engaging element forming yarns 121*a*, 121*b* knitted in a doubled manner into adjoining same courses in the zigzag shape are constructed under such an zigzag-like structure which disables the yarn from being pulled out easily and that the engaging element forming yarns 121*a*, 121*b* are doubled and disposed in the zigzag shape, the first and second engaging element forming yarns 121*a*, 121*b* restrict motions thereof in a yarn direction. As a result, the respective engaging element forming yarns 121*a*, 121*b* become very difficult to be pulled out separately. Consequently, even if a pulling force is applied to the hook 120, it is not pulled out easily. Further, because a surface of the base fabric 110 on an opposite side to a surface in which the hooks 120 are formed is not coated with back coating material such as synthetic resin, the thickness of the base fabric 110 is not increased and flexibility and ventilation proper to knitted fabric are secured.

Second Embodiment

Figure 4:
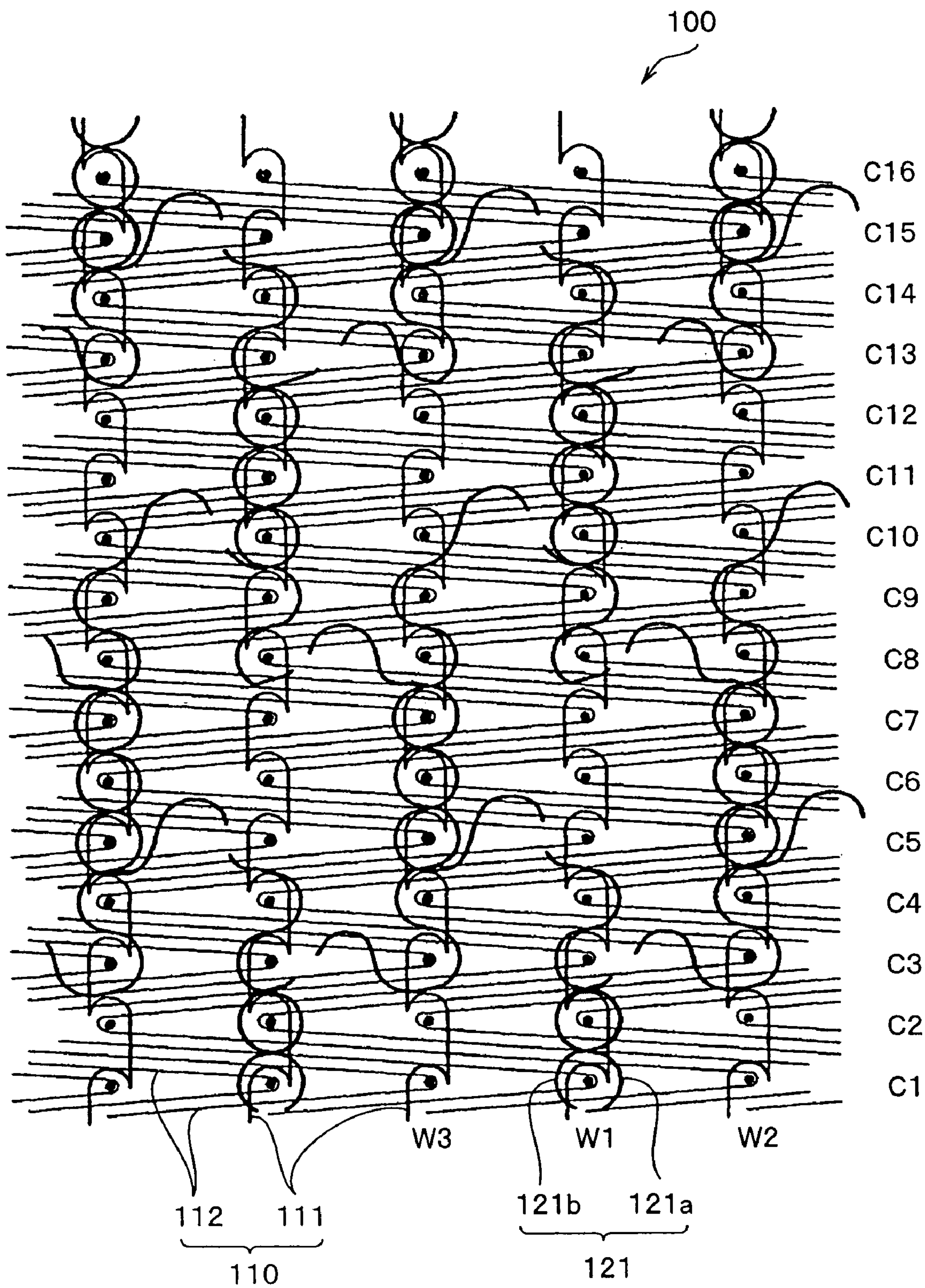
FIG. 4 is an entire structure diagram of a knitted surface fastener according to a second embodiment of the present invention.
Figure 5:
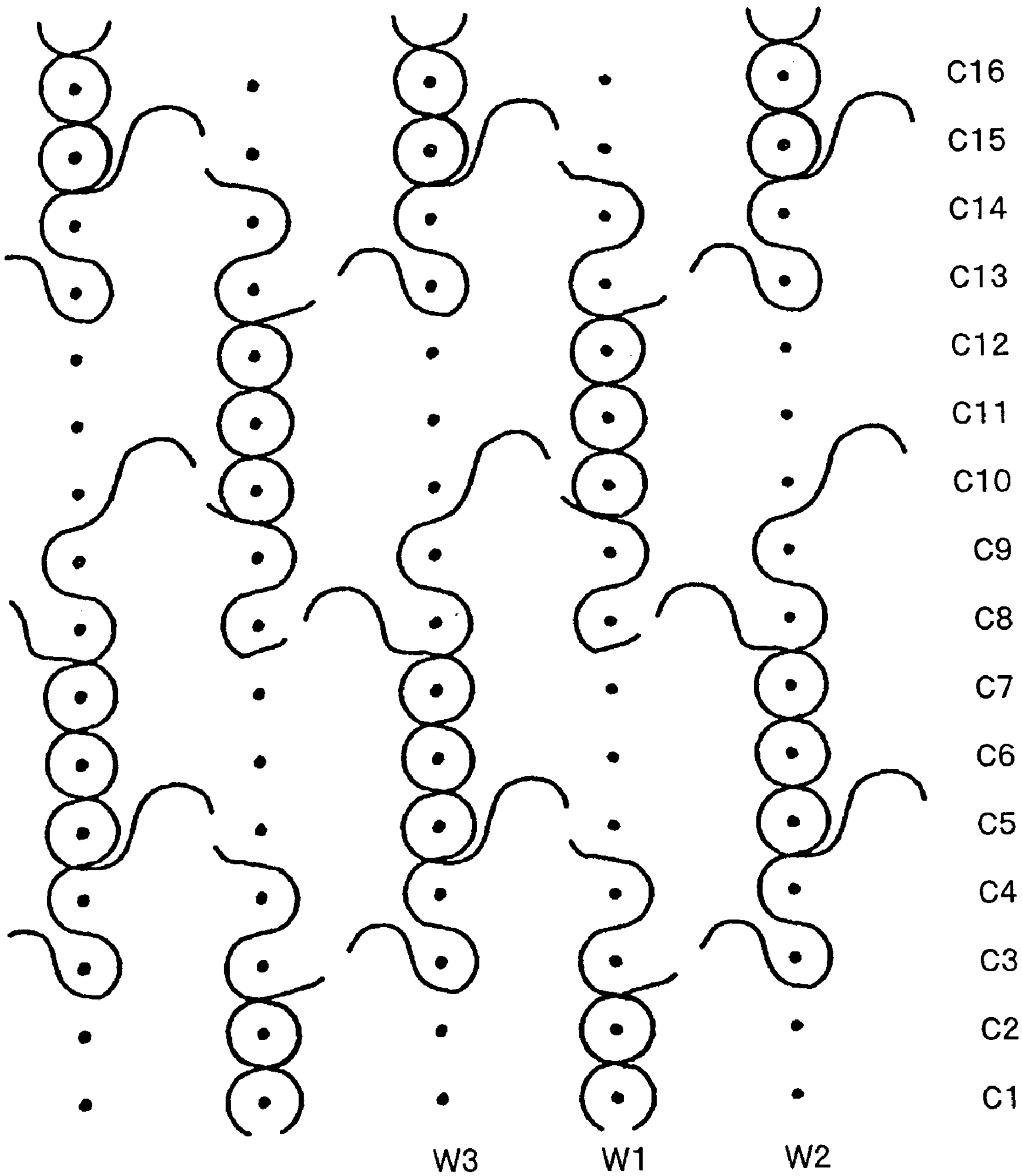
FIG. 5 is a knitting structure diagram of first and second engaging element forming yarns excluding a base fabric structure of the same surface fastener.
Figure 6:
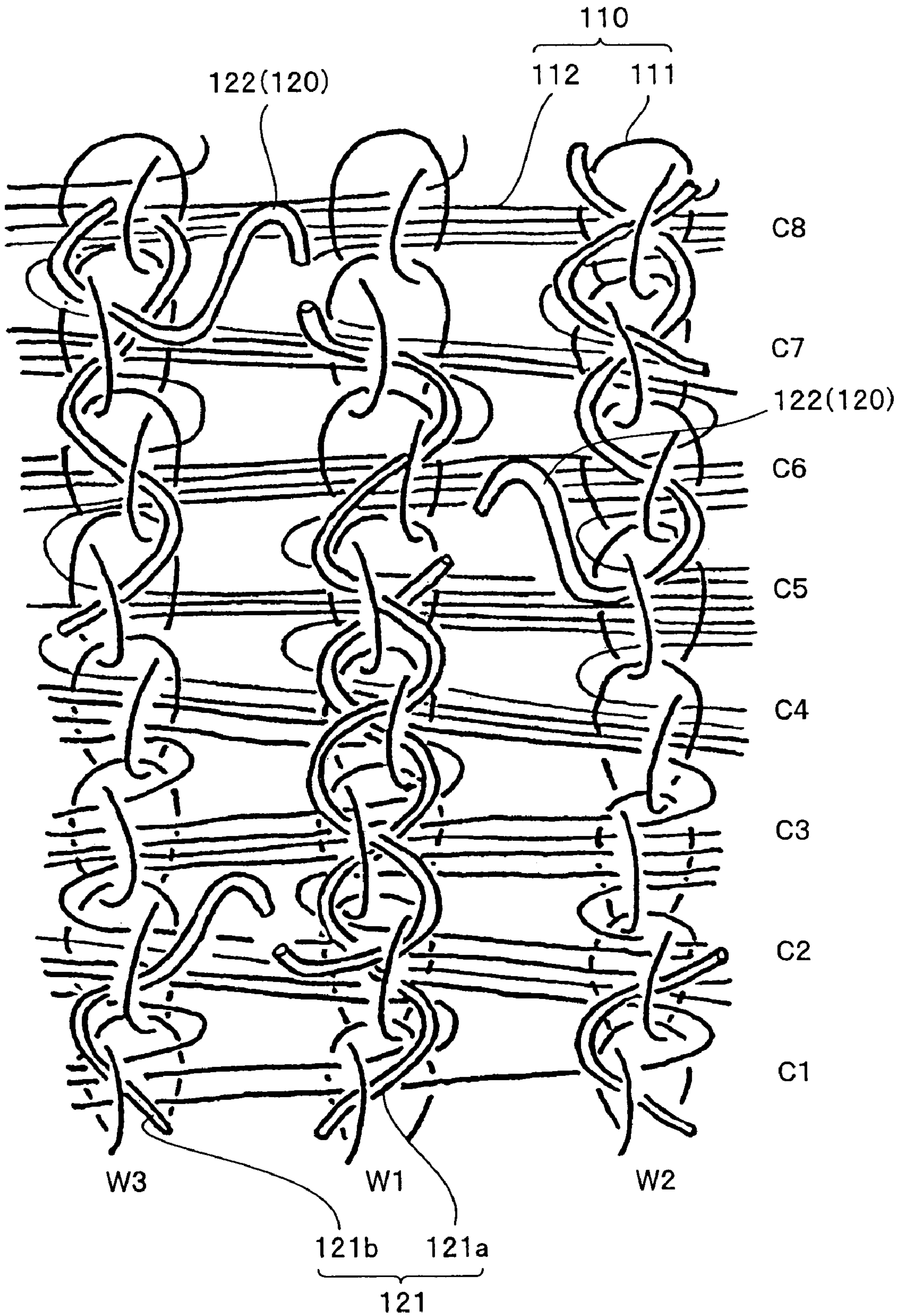
FIG. 6 is a 3-dimensional diagram schematically showing part of the knitting construction of the same surface fastener.

FIG. 4 is a structure drawing showing an entire structure of a knitted surface fastener 100 according to a second embodiment of the present invention. According to this embodiment also, a base fabric 110 is composed of chain knitting yarns 111 having 1-0/0-1 structure forming wales W and weft in-laid yarns 112 having 0-0/5-5 structure running across five wales W in the zigzag shape, each of the weft in-laid yarn being inserted into stitches of the chain knitting yarns 111. At a same time when the base fabric 110 is formed, loops are formed by knitting an engaging element forming yarns 121 into the same base fabric. A side portion of each of the loops is cut out during or after knitting so as to form a hook 120. FIG. 5 is a knitting structure drawing of two engaging element forming yarns 121*a*, 121*b* excluding the knitting structure of the base fabric 110. FIG. 6 schematically shows a knitting construction of a knitted surface fastener of this embodiment. Although sizes of knitting yarns shown in FIG. 6, particularly sizes of the composition yarns 111, 112 of the base fabric 110 and the first and second engaging element forming yarns 121*a*, 121*b* forming loops are changed extremely and gaps between stitches are enlarged by reducing their knitting density, there is not so much difference between the sizes of the composition yarns 111, 112 of the base fabric 110 and the sizes of the first and second engaging element forming yarns 121*a*, 121*b* and the gaps between the knitting yarns are much smaller.

According to this embodiment also, the engaging element forming yarns 121 are composed of the two first and second engaging element forming yarns 121*a*, 121*b*. As for the knitting structures of the first and second engaging element forming yarns 121*a*, 121*b*, as shown in FIGS. 4 to 6, the first engaging element forming yarn 121*a* is 1-1/2-2/0-0/1-1/0-0/1-1/0-0/2-2/1-1/0-0 and the second engaging element forming yarn 121*b* is 1-1/0-0/1-1/0-0/2-2/1-1/2-2/1-1/2-2/0-0. In this embodiment, what is largely different from the first embodiment is that, although according to the first embodiment when the first and second engaging element forming yarns 121*a*, 121*b* are knitted into the same wale in the zigzag shape, they are knitted in parallel such that they do not intersect each other, according to the second embodiment when the first and second engaging element forming yarns 121*a*, 121*b* are knitted in the same wale in the zigzag shape, they are intersected with each other at each stitch.

When a repetition unit of the knitting structure is of even courses, even if the first and second engaging element forming yarns 121*a*, 121*b* are knitted in the zigzag shape by intersecting them with each other, engaging element loops 122 can be disposed equally over an entire surface of the base fabric 110 in a staggered fashion. When the first and second engaging element forming yarns 121*a*, 121*b* are knitted in the zigzag shape so as to intersect each other on a same wale, even if a strong pulling force is applied to the loops, the first and second engaging element forming yarns 121*a*, 121*b* restrict motions of mating yarn at each intersection point and therefore, they are not easily pulled out.

Third Embodiment

Figure 7:
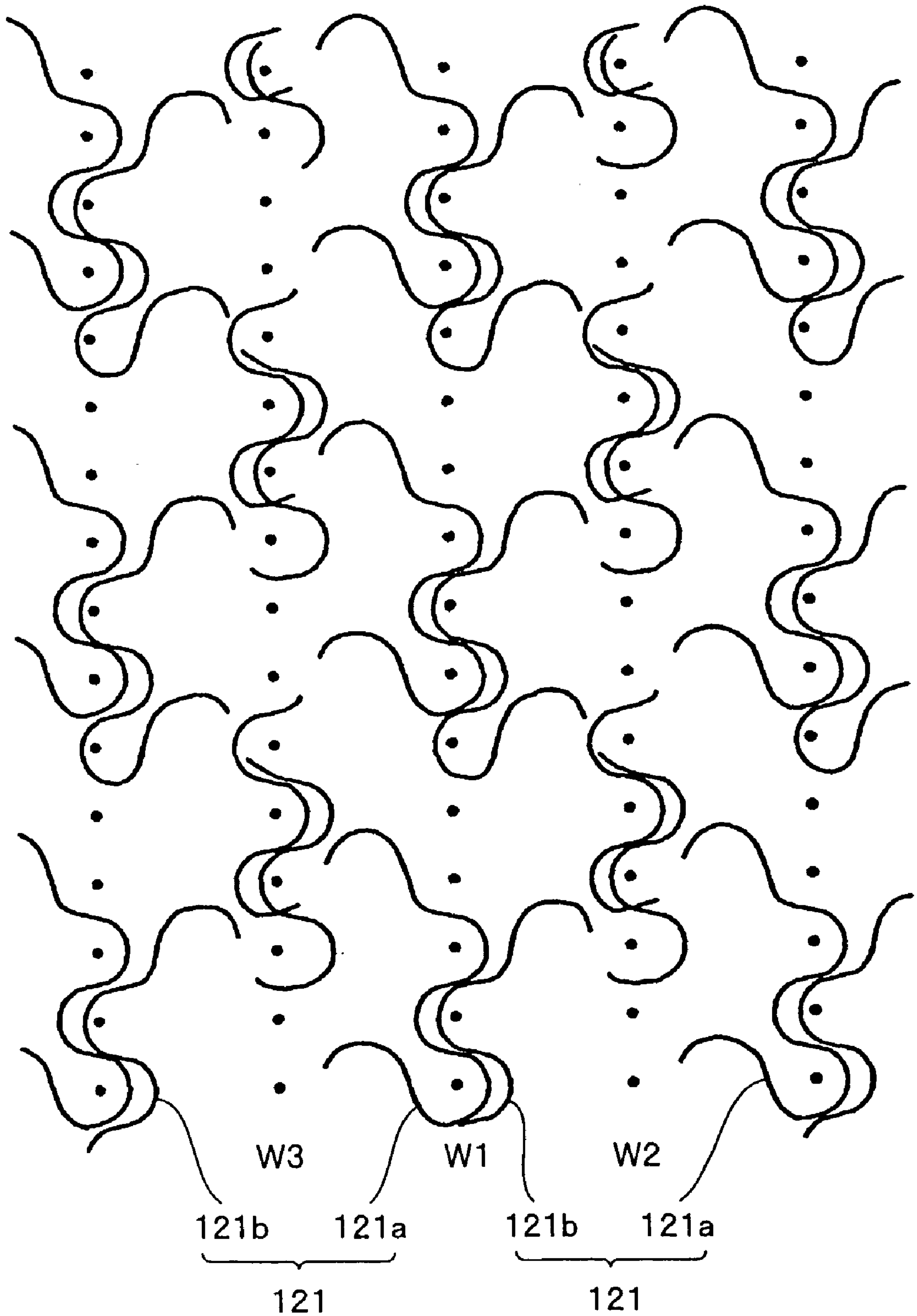
FIG. 7 is a knitting structure diagram of first and second engaging element forming yarns excluding a base fabric structure of a knitted surface fastener according to a third embodiment of the present invention.

FIG. 7 shows a third embodiment of a knitted surface fastener 100 of the present invention. FIG. 7 shows only knitting structures of first and second engaging element forming yarns 121*a*, 121*b* while the knitting structure of a base fabric 110 is omitted because its is same as that of the first embodiment. According to this embodiment, the knitting structure of the first engaging element forming yarn 121*a* is 0-0/1-1/0-0/2-2/1-1/2-2 and the knitting structure of the second engaging element forming yarn 121*b* is 1-1/2-2/0-0/1-1/0-0/2-2. That is, the first and second engaging element forming yarns 121*a*, 121*b* are deviated by a single course in a course direction and inserted in a doubled manner in the zigzag shape into a sinker loop of each chain stitch formed in adjoining three courses on a same wale.

Therefore, the first and second engaging element forming yarns 121*a*, 121*b* are inserted into chain stitches of adjoining two courses in a double manner in the zigzag shape on a wale and after that, they move to wales adjoining on right and left of the wale while forming the engaging element loops 122. Subsequently, they are inserted into chain stitches of two courses in a doubled manner in the zigzag shape and return to the original wale while forming the engaging element loops 122. This pattern is repeated. Thus, according to this embodiment, each of the engaging element loops 122 is formed for every three courses and if compared with the first and second embodiments, a density of the engaging elements increases and the engagement strength is intensified. Of course, the loops are difficult to be pulled out and necessity of back coating does not exist, so that flexibility and ventilation proper to knitted fabric are secured like the first and second embodiments.

Fourth Embodiment

Figure 8:
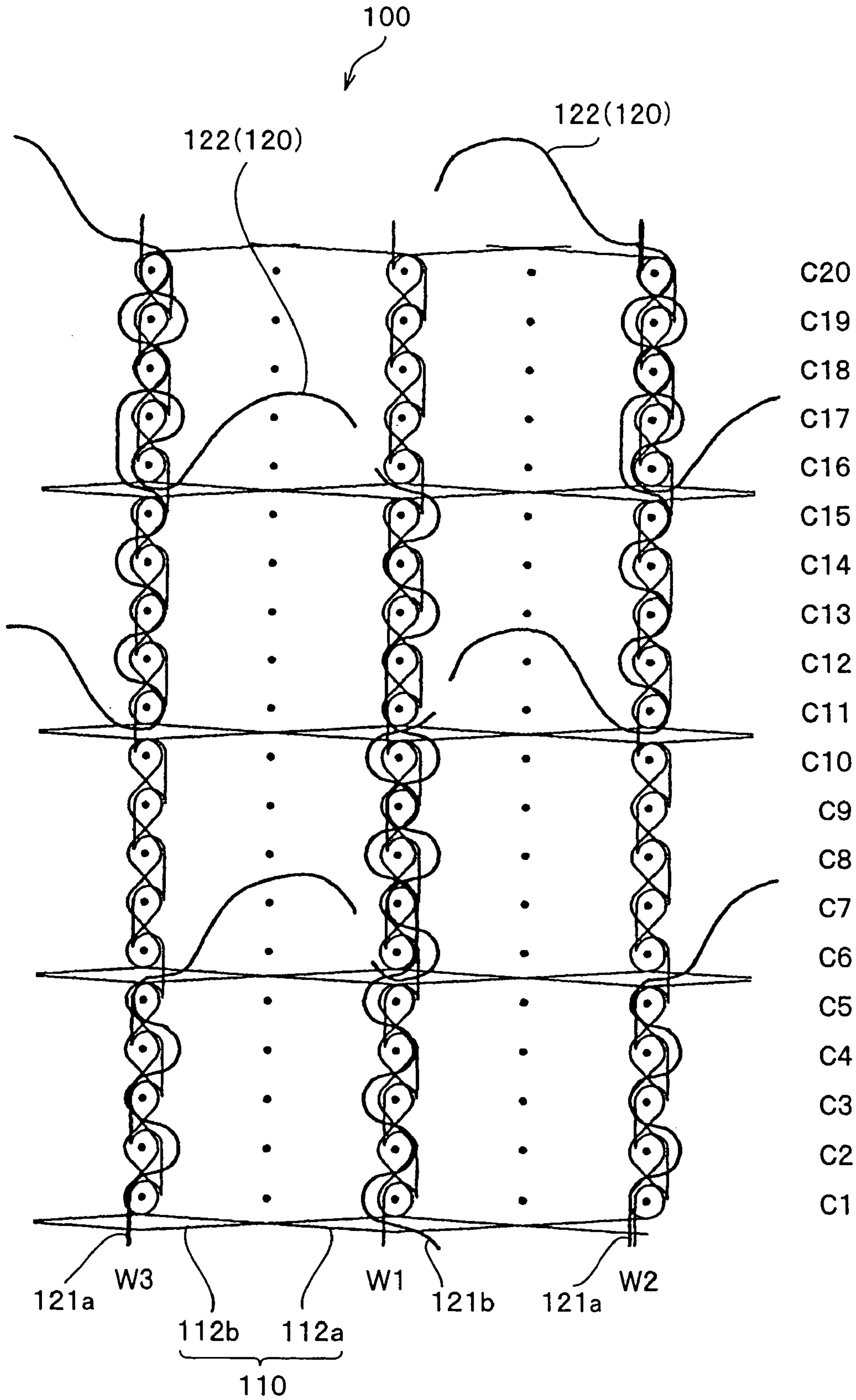
FIG. 8 is an entire knitting structure diagram of a knitted surface fastener according to a fourth embodiment of the present invention.
Figure 9:
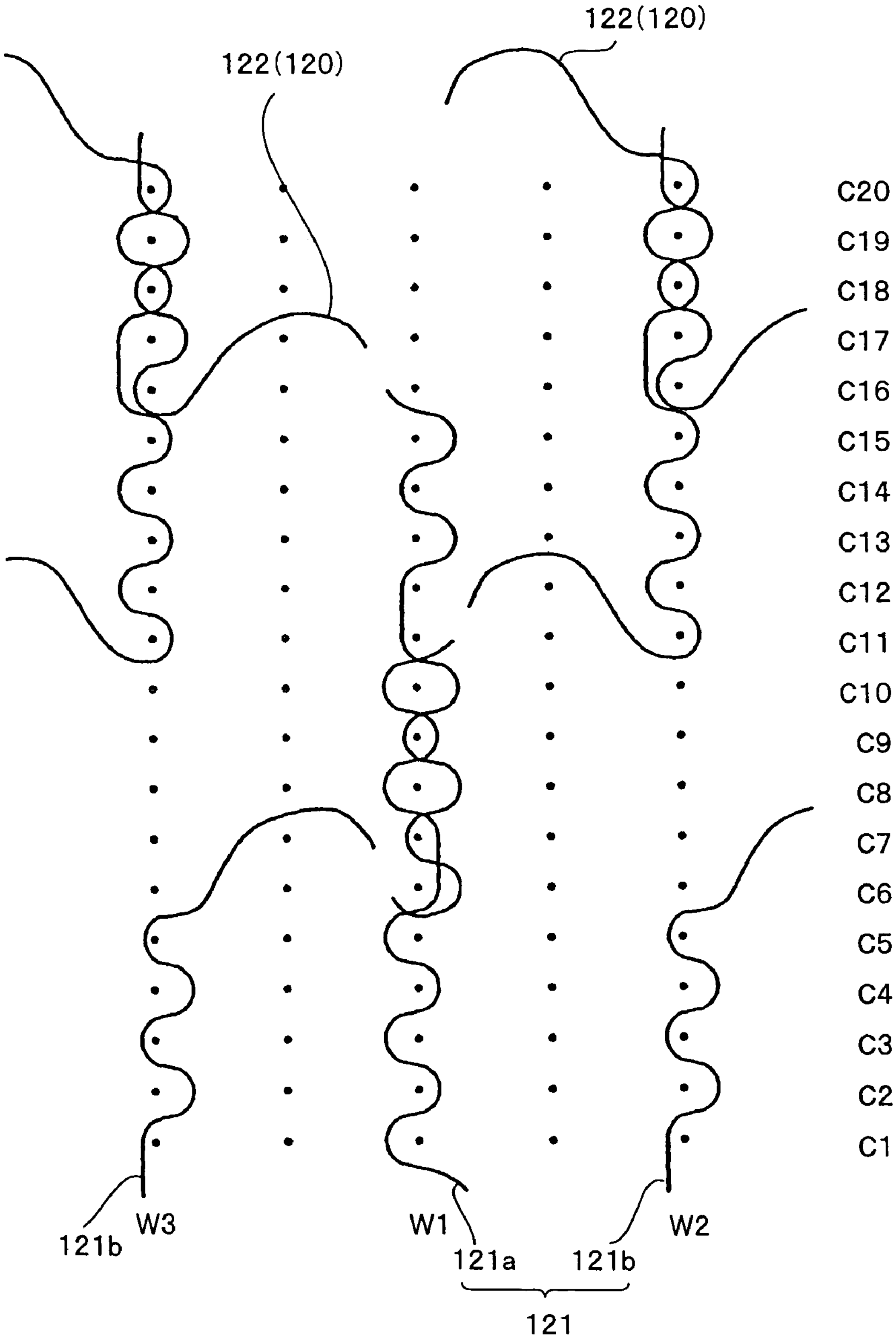
FIG. 9 is a knitting structure diagram of first and second engaging element forming yarns excluding a base fabric structure of the same surface fastener.

FIGS. 8 and 9 show a fourth embodiment of the present invention. FIG. 8 shows an entire knitting structure of a knitted surface fastener and FIG. 9 shows knitting structures of first and second engaging element forming yarns 121*a*, 121*b*. A base fabric 110 is constituted of chain knitting yarns 111 and first and second weft in-laid yarns 112*a*, 112*b*. The knitting structure of each of the chain knitting yarns 111 is 1-0/0-1, constituting wales of the base fabric 110. According to this embodiment, the chain knitting yarn 111 skips every other needle in a course C direction (right and left direction in each drawing) over entire knitting yarns so as to form the wale W.

The knitting structure of the first weft in-laid yarn 112*a* is 0-0/1-1/0-0/1-1/0-0/3-3/2-2/3-3/2-2/3-3 and the knitting structure of the second weft in-laid yarn 112*b* is 3-3/2-2/3-3/2-2/3-3/0-0/1-1/0-0/1-1/0-0. As understood from FIG. 1 and these knitting structures, the base fabric 110 of this embodiment is formed into a net shape having large gaps surrounded in a square shape by the first and second weft in-laid yarns 112*a*, 112*b* inserted into the chain knitting yarns 111 constituting two rows of wales and sinker loops of chain stitches of every five courses composed by the chain knitting yarns 111 alternately.

On the other hand, a knitting structure of the first engaging element forming yarn 121*a* is 3-3/2-2/3-3/2-2/3-3/0-0/1-1/0-0/1-1/0-0/1-1/1-1/0-0/1-1/0-0/3-3/2-2/3-3/2-2/3-3 and a knitting structure of the second engaging element forming yarn 121*b* is 3-3/2-2/3-3/2-2/3-3/2-2/2-2/3-3/2-2/3-3/0-0/1-1/0-0/1-1/0-0/1-1/1-1/0-0/1-1/0-0.

That is, after the first engaging element forming yarn 121*a* is knitted in the zigzag shape into the sinker loops of the chain stitches of adjoining four courses C2 to C5 on a wale W1, it is inserted into the sinker loop of the chain stitch formed in the course C5 on a wale W2 knitted by skipping a single needle in a direction of the course C while forming an engaging element loop 122 and next, inserted in the zigzag shape into sinker loops of chain stitches formed in the adjoining four courses C6 to C9 on the same wale W2 and then, inserted into a sinker loop of a chain stitch of a course 11 by skipping a single chain stitch of the adjoining single course C10. Subsequently, it is inserted in the zigzag shape into sinker loops of the chain stitches formed in following three courses C12 to C14. This first engaging element forming yarn 121*a* moves to the same course C14 of the original wale W1 while forming the engaging element loop 122 and after it is inserted into a sinker loop of a chain stitch formed there, it is inserted into sinker loops of chain stitches formed in four adjoining courses C15 to C18 in the zigzag shape and after a single chain stitch of an adjoining course C19 is skipped, it is inserted into a sinker loop of a chain stitch formed in a course 20. After that, this pattern is repeated.

In the course C2 on the wale W2 formed by skipping a single needle in the direction of the course of the wale W1, the second engaging element forming yarn 121*b* is knitted in the zigzag shape into sinker loops of chain stitches of adjoining five courses C2 to C6 like the first engaging element forming yarn 121*a* and then, by skipping a single chain stitch of the next course C7, it is inserted into a sinker loop of the chain stitch of the course C8. Subsequently, the second engaging element forming yarn 121*b* is inserted into sinker loops of the chain stitches formed in adjoining three courses C9 to C11 in the zigzag shape. The second engaging element forming yarn 121*b* after being inserted into the course C11, is moved to the same course C11 of the wale W3 formed by skipping a single needle to right in the course direction in FIG. 9 while forming the engaging element loop 122, and inserted into a sinker loop of the chain stitch formed there. After that, it is inserted into sinker loops of the chain stitches formed in adjoining four courses C12 to C15 in the zigzag shape and, by skipping a single chain stitch of the course C16, inserted into the sinker loop of the chain stitch formed on the adjoining course C17. Subsequently, it is inserted into sinker loops of the chain stitches formed in the two courses C18, C19. Here, the second engaging element forming yarn 121*b* is returned to the same course C19 in the original wale W2 while forming the engaging element loop 122 and inserted into the sinker loop of the chain stitch formed in the same course C19. After that, this pattern is repeated.

According to the fourth embodiment, the engaging element loops 122 are located between two wales of a net-like base fabric 110 having square gaps and formed in a staggered fashion along the first and second weft in-laid yarns 112*a*, 112*b* corresponding to the weft yarn. Thus, each of the engaging element loops 122 never transverses the square gaps and therefore, even after the surface fastener 100 is formed, a net-like cloth shape is maintained. Because the first and second engaging element forming yarns 121*a*, 121*b* knitted in the same wale in the zigzag shape have many courses and the first and second engaging element forming yarns 121*a*, 121*b* are knitted in a wale direction (vertical direction in the drawing) into each sinker loop of the respective chain stitches formed in five courses in the zigzag shape by skipping a single gap, such that they intersect the sinker loop, even if a strong pulling force is applied to each engaging element loop 122, they restrict a movement of each mating one and as a consequence, even if no back coating is performed on a surface on an opposite side to a surface in which the engaging element loop 122 is formed, the first and second engaging element forming yarns 121*a*, 121*b* are never pulled out of the base fabric 110.

Although the first and second engaging element forming yarns 121*a*, 121*b* of the above-mentioned embodiment are all composed of mono-filaments and form male surface fasteners in which hooks are formed by cutting out side portions thereof after forming the engaging element loops 122, it is permissible to use multi-filament all for the first and second engaging element forming yarns 121*a*, 121*b* and produce a female surface fastener by napping the formed engaging element loops to separate individual filaments and then executing thermal setting with multi-directivity given. Further, it is also permissible to use the mono-filament for any one of the first and second engaging element forming yarns 121*a*, 121*b* while using the multi-filament for the other one of the engaging element forming yarns 121*b*, 121*a* to form each engaging element loop 122 and then produce a male/female mixing surface fastener in which hooks and loops are mixed by cutting the engaging element loops 122 composed of the mono-filament. Although not shown, it is possible to use a tricot knitting yarn as a composition knitting yarn of the base fabric 110.

What is claimed is:

1. A knitted surface fastener made of warp knitted fabric in which a base fabric is warp knitted while plural engaging element loops of at least any one of male and female are formed on a surface thereof, the knitted surface fastener comprising:

warp knitting yarns for forming wales; and connecting yarns for connecting the respective wales, wherein the engaging element loops are formed of engaging element forming yarns striding over two or more wales, the engaging element forming yarns include adjoining first and second engaging element forming yarns and each of the engaging element forming yarns is knitted over at least three adjoining courses on a same wale in a zigzag shape, and the first and second engaging element forming yarns are knitted into adjoining same stitches at least in two or more courses of a same wale in a zigzag shape.

2. The knitted surface fastener according to claim 1, wherein each of the warp knitting yarns is a chain knitting yarn and each of the connecting yarns is a weft in-laid yarn.

3. The knitted surface fastener according to claim 1, wherein the first and second engaging element forming yarns are knitted in a doubled manner in a same wale.

4. The knitted surface fastener according to claim 1, wherein the first and second engaging element forming yarns are knitted in a same wale such that they intersect each other.

5. The knitted surface fastener according to claim 1, wherein the engaging element loops are disposed in a staggered fashion.

* * * * *